United States Patent
Miao et al.

(10) Patent No.: US 10,147,216 B1
(45) Date of Patent: Dec. 4, 2018

(54) INTELLIGENT CAMERA

(71) Applicant: Essential Products, Inc., Palo Alto, CA (US)

(72) Inventors: Xiaoyu Miao, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

(21) Appl. No.: 15/812,518

(22) Filed: Nov. 14, 2017

Related U.S. Application Data

(60) Provisional application No. 62/580,278, filed on Nov. 1, 2017.

(51) Int. Cl.
| | |
|---|---|
| *G06N 3/08* | (2006.01) |
| *G06T 11/60* | (2006.01) |
| *H04N 7/18* | (2006.01) |
| *G06T 7/194* | (2017.01) |
| *G06T 5/00* | (2006.01) |
| *G06K 9/62* | (2006.01) |
| *G06N 3/04* | (2006.01) |
| *G06K 9/66* | (2006.01) |

(52) U.S. Cl.
CPC ............ *G06T 11/60* (2013.01); *G06K 9/6267* (2013.01); *G06K 9/66* (2013.01); *G06N 3/04* (2013.01); *G06N 3/08* (2013.01); *G06T 5/002* (2013.01); *G06T 7/194* (2017.01); *H04N 7/185* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 7,003,136 B1 * | 2/2006 | Harville | G06K 9/00201 348/169 |
| 9,223,781 B2 | 12/2015 | Pearson et al. | |
| 9,704,231 B1 | 7/2017 | Kulewski et al. | |
| 9,734,567 B2 | 8/2017 | Zhang et al. | |

(Continued)

OTHER PUBLICATIONS

Non-Final Office Action dated May 31, 2018 in U.S. Appl. No. 15/812,546 of Miao, X. et al., filed Nov. 14, 2017.

(Continued)

*Primary Examiner* — Gregory M Desire
(74) *Attorney, Agent, or Firm* — Perkins Coie LLP

(57) ABSTRACT

Presented here is technology to efficiently process camera images to generate artistic images and videos using an artificial intelligence module receiving inputs from multiple sensors. Multiple sensors can include a depth sensor, a conventional camera, and a motion tracker providing inputs to the artificial intelligence module. Based on the inputs, the artificial intelligence module can segment the received image and/or video into a foreground image and a background image to produce portrait imagery by blurring the background image and/or video. The artificial intelligence module can select the most aesthetically pleasing image from a video. In addition, the artificial intelligence module can adjust lighting in an image or video to create artistic lighting effects. All the processing can be done in real time due to efficient combination of artificial intelligence modules, traditional image processing techniques, and use of specialized hardware.

16 Claims, 15 Drawing Sheets

(56) References Cited

U.S. PATENT DOCUMENTS

2008/0064377 A1    3/2008  Mori
2015/0101064 A1    4/2015  Taki
2017/0155887 A1*   6/2017  Zhou ................. H04N 13/0239

OTHER PUBLICATIONS

Notice of Allowance dated Jul. 17, 2018 in U.S. Appl. No. 15/812,546, 10 pages.

* cited by examiner

INTELLIGENT CAMERA

CROSS-REFERENCE TO RELATED APPLICATIONS

This application claims priority to the U.S. provisional application Ser. No. 62/580,278, filed Nov. 1, 2017, which is incorporated herein by this reference in its entirety.

TECHNICAL FIELD

The present application is related to a camera, and more specifically to methods and systems that perform image processing on images or videos recorded by the camera.

BACKGROUND

Today's ubiquitous cell phone cameras contain a normal lens and record normal lens images, where the background and foreground tend to be equally focused, the lighting is the natural lighting surrounding the scene, and image framing is performed by the cell phone user. The images thus produced generally lack artistic value and aesthetic appeal.

SUMMARY

Presented here are systems and methods to efficiently process camera images to generate artistic images and videos using an artificial intelligence module receiving inputs from multiple sensors. Multiple sensors can include a depth sensor, a conventional camera, and a motion tracker providing inputs to the artificial intelligence module. Based on the inputs, the artificial intelligence module can segment the received image and/or video into a foreground image and a background image to produce portrait imagery by blurring the background image and/or video. The artificial intelligence module can select the most aesthetically pleasing image from a video. In addition, the artificial intelligence module can adjust lighting in an image or video to create artistic lighting effects. All the processing can be done in real time due to efficient combination of artificial intelligence modules, traditional image processing techniques, and use of specialized hardware such as graphics processing unit (GPU), and artificial intelligence chips e.g. a tensor processing unit (TPU).

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
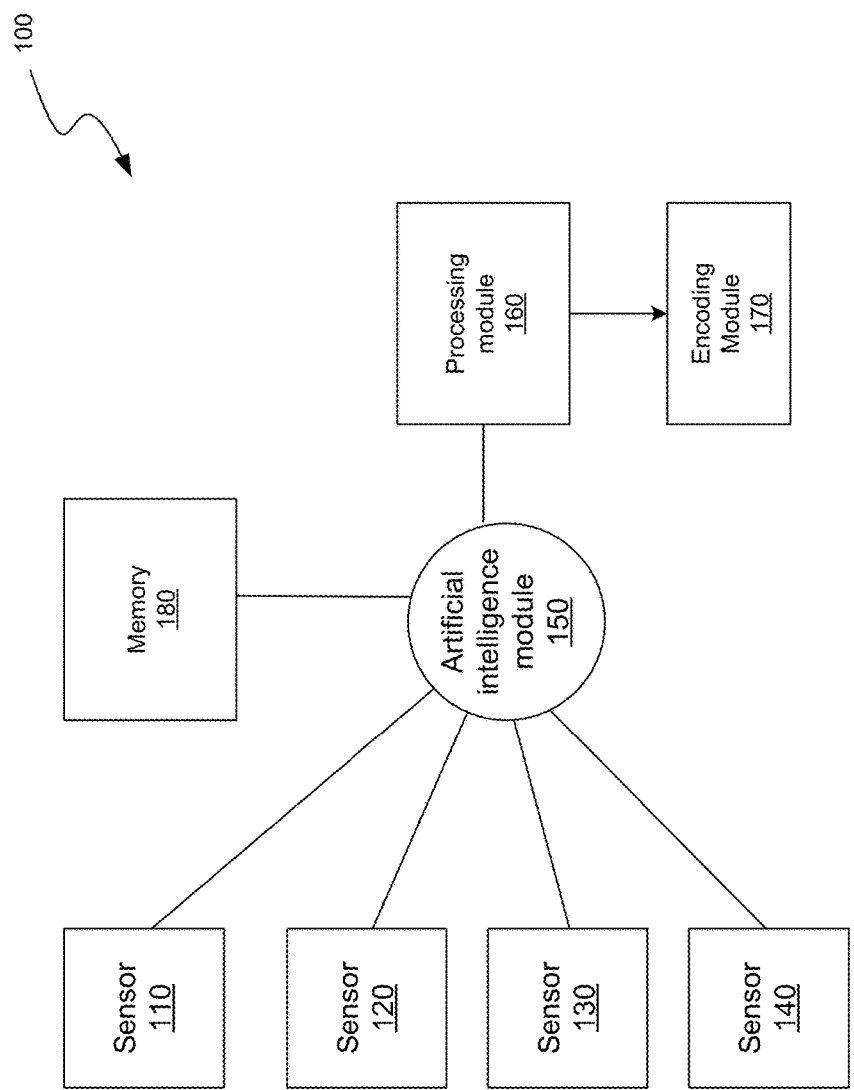
FIG. 1 is a system architecture of an intelligent camera.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly, or via one or more intermediary channels or devices. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Intelligent Camera

Presented here are systems and methods to efficiently process camera images to generate artistic images and videos using an artificial intelligence module receiving inputs from multiple sensors. Multiple sensors can include a depth sensor, a conventional camera, and a motion tracker providing inputs to the artificial intelligence module. Based on the inputs, the artificial intelligence module can segment the received image and/or video into a foreground image and a background image to produce portrait imagery by blurring the background image and/or video. The artificial intelligence module can select the most aesthetically pleasing image from a video. In addition, the artificial intelligence module can adjust lighting in an image or video to create artistic lighting effects. All the processing can be done in real time due to efficient combination of artificial intelligence modules, traditional image processing techniques, and use of specialized hardware such as graphics processing unit (GPU), and an artificial intelligence chip e.g. a tensor processing unit (TPU). The artificial intelligence module can be a neural network, a deep feedforward neural network, a deep recurrent neural network, etc.

FIG. 1 is a system architecture of an intelligent camera. The intelligent camera 100 contains multiple sensors 110 120, 130, 140 in communication with an artificial intelligence module 150, a memory 180, an optional processing module 160, and an optional encoding module 170. The optional encoding module 170 compresses the final image into an image or video file format such as JPEG, TIFF, GIF, BMP, PNG, AVI, MP4, FLV, RealMedia, Matroska, etc.

Multiple sensors 110, 120, 130, 140 can include a light sensor 110, 120, a depth sensor 130, an accelerometer 140, a gyroscope, an optional magnetometer, a temperature sensor, an air-quality sensor, a locator such as a GPS transceiver, etc. The intelligent camera 100 can be implemented wholly within a mobile device such as a cell phone, a PDA, a tablet, etc., or wholly within an accessory to the mobile device. Finally, the functionality of intelligent camera 100 can reside partly in the mobile device and partly within the accessory, as disclosed in this application.

The light sensor 110, 120 can be a traditional RGB camera, and/or a fisheye camera. The RGB camera 110 can record an image or a video of the surrounding environment to produce a visual representation such as an image or video in color or black-and-white. The fisheye camera 120 can record a wide-angle view of the surrounding environment, up to 220° around the fisheye camera. The fisheye camera 120 can be a black-and-white camera.

The depth sensor 130 records depth of various points surrounding the depth sensor. The depth sensor can be a time of flight sensor, a structured light sensor, or a dual camera extracting depth information based on stereoscopic images. The depth sensor 130 can produce a point cloud as an output. A point cloud is a set of usually unconnected data points in some coordinate system. The point cloud includes points in the environment surrounding the intelligent camera 100. Additionally, the RGB camera 110, the fisheye camera 120, and/or the depth sensor 130 can produce motion tracking data. With motion tracking, the intelligent camera 100 can track the movement of an object, and identify objects within an image and/or a video.

Traditional stereoscopic cameras associated with cell phones can discern depth up to 80 cm away from a device, such as the cell phone. Using the depth sensor presented in this application, depth can be discerned up to 5 m away from the device.

The various sensors 110, 120, 130, 140 can create a three-dimensional map of the environment surrounding the intelligent camera 100, and can determine the position and orientation of the intelligent camera 100 within the environment. Once created, the three-dimensional map of the environment can be stored within the memory 180 of the intelligent camera 100. The locator sensor of the intelligent camera 100 can determine the location of the intelligent camera 100 such as GPS coordinates. Once the intelligent camera 100 knows the location, the intelligent camera 100 can retrieve the three-dimensional map surrounding the location from the memory 180, and determine an area of the environment the light sensor 110, 120 is oriented toward. Thus, even before the light sensor 110, 120 records a picture, the light sensor 110, 120 has a representation of the environment that is being recorded.

Figure 2A:
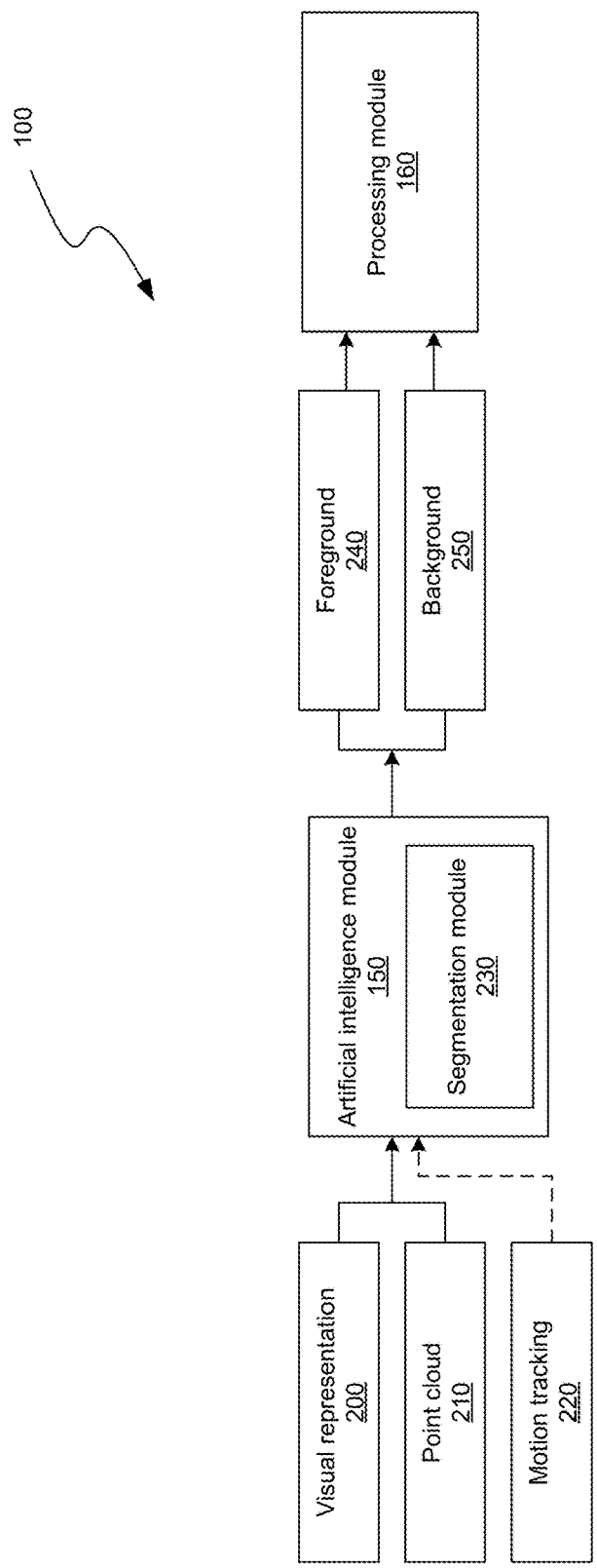
FIG. 2A shows a system architecture to perform image segmentation using the intelligent camera.

FIG. 2A shows a system architecture to perform image segmentation using the intelligent camera 100. The sensors 110, 120, 130, 140 in FIG. 1 can produce data such as visual representation 200, point cloud 210, and/or motion tracking data 220. Using these inputs, the artificial intelligence module 150 can perform image segmentation. Specifically, the segmentation module 230 of the artificial intelligence module 150 receives the visual representation 200, point cloud 210 and can optionally receive motion tracking data to separate the visual representation into a foreground 240 and a background 250.

Using the visual representation 200, which can be an image or video in color or in black and white, and the point cloud 210, the segmentation module 230 can extract object edges and the distance of various objects from the camera. Based on the distance of various objects from the intelligent camera 100, the segmentation module 230 can determine that the objects closer to the intelligent camera 100 belong to the foreground 240, while the rest of the objects belong to the background 250. For example, an object within 5 meters (m) from the intelligent camera 100 belongs to the foreground 240, while an object beyond 5 m belongs to the background 250. In another example, the foreground and the background distance are not defined in terms of predefined distances from the intelligent camera 100, but in relation to other objects. More specifically, the closest object to intelligent camera 100 is considered to be in the foreground. Let us assume the distance between the closest object and the intelligent camera 100 is D. In addition to the closest object, any other object within 1.2*D is also considered to be in the foreground.

In addition to the visual representation 200 and the point cloud 210, the segmentation module 230 can use parallax to determine foreground and background objects. Due to foreshortening, nearby objects show a larger parallax than farther objects when observed from different positions, so parallax can be used to determine distances. In other words, foreground objects tend to move more than background objects in a two-dimensional video. Therefore, based on the motion of the object, the segmentation module 230 can separate objects into the foreground and background.

In addition, the segmentation module 230 can include a neural network trained to separate foreground and background objects from images, video, point clouds and/or motion tracking data.

Once the visual representation 200 has been separated into the foreground 240 and the background 250, the processing module 160 can perform various operations independently on the foreground 240 and the background 250. For example, the processing module 160 can blur the background 250, while leaving the foreground 240 as is, or even sharpening it. The processing module 160 can then combine the focused foreground 240 and the blurred background 250 to obtain a portrait image. The processing module 160 can create a portrait image of an input still image or an input video in real time.

The processing module 160 can also replace the background 250 with a different background. For example, a video of a person driving a car in rush-hour traffic, can be replaced with a video of a person driving the car close to the beach with stunning sunset views. In another example, the background in a videoconferencing video can be blurred, or replaced with a more pleasing video, such as a conference setting, a logo of a company, advertisements, etc.

Traditional cell phone cameras, such as Google and Apple cell phone cameras, require 3 to 4 seconds to create a portrait picture, while the technology described in this application can create a portrait picture in real time. The reason that the segmentation into foreground and background of the visual representation 200 can be done in real time is the efficient combination of artificial intelligence module 150 and traditional image processing. Traditional image processing operations such as edge detection, distance measurement, motion tracking, image blurring, image sharpening, etc. can be performed quickly. Additionally the image processing operations can run on dedicated hardware such as a graphics processing unit (GPU). Combining the visual representation 200, the point cloud 210 and motion tracking 220 to obtain the foreground 240 and the background 250 is performed by a trained artificial intelligence module 150 running on dedicated hardware such as a GPU or a tensor processing unit (TPU).

Figure 2B:
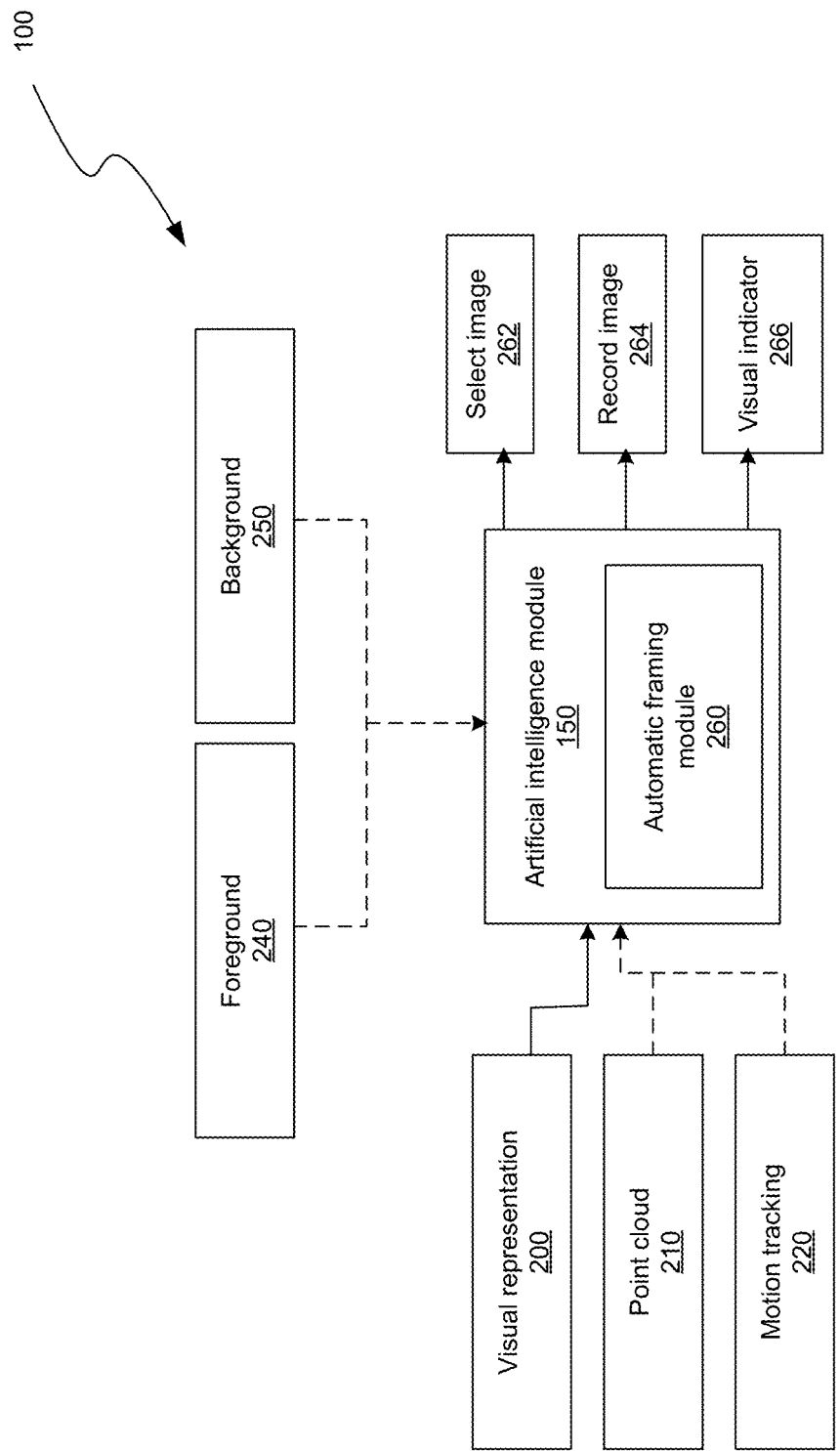
FIG. 2B shows a system architecture to perform automatic framing using the intelligent camera.

FIG. 2B shows a system architecture to perform automatic framing using the intelligent camera 100. The sensors 110, 120, 130, 140 in FIG. 1 can produce data such as visual representation 200, point cloud 210, and/or motion tracking data 220. Using these inputs, the artificial intelligence module 150 can perform automatic framing. Specifically, the automatic framing module 260 of the artificial intelligence module 150 receives the visual representation 200, and optionally the point cloud 210 and motion tracking data 220 to determine the most aesthetically pleasing picture within the visual representation 200.

The visual representation 200 can contain multiple images, a recorded video, or a continuous video feed from the light sensor 110, 120. The automatic framing module 260 can contain a neural network trained to determine the most aesthetically pleasing picture from the visual representation 200, and produce an image 262. In addition, the automatic framing module 260 can take in the point cloud 210 and the motion tracking data 220 to determine object boundaries and determine distances between the intelligent camera 100 and various objects in the visual representation 200. Further, the automatic framing module 260 can also take in the foreground 240 and background 250 data to determine the focal point of the visual representation 200.

In one example, a user can point the intelligent camera 100 at a scene and slightly move the intelligent camera 100 around the scene. While the user is moving the intelligent camera 100, the automatic framing module 260 can automatically record the most aesthetically pleasing image 264 from all the possible images viewed by the intelligent camera 100 as the intelligent camera 100 is moved around the scene. Alternatively, or in addition to, the automatic framing module 260 can display a visual indicator 266 indicating to the user that the image currently visible by the intelligent camera 100 is the most aesthetically pleasing or indicating that the intelligent camera 100 is recording the image currently visible by the intelligent camera 100.

The reason that the automatic framing of the visual representation 200 can be done in real time is that the automatic framing module 260 is running on dedicated hardware such as a GPU or an artificial intelligence chip, e.g. a TPU.

Figure 2C:
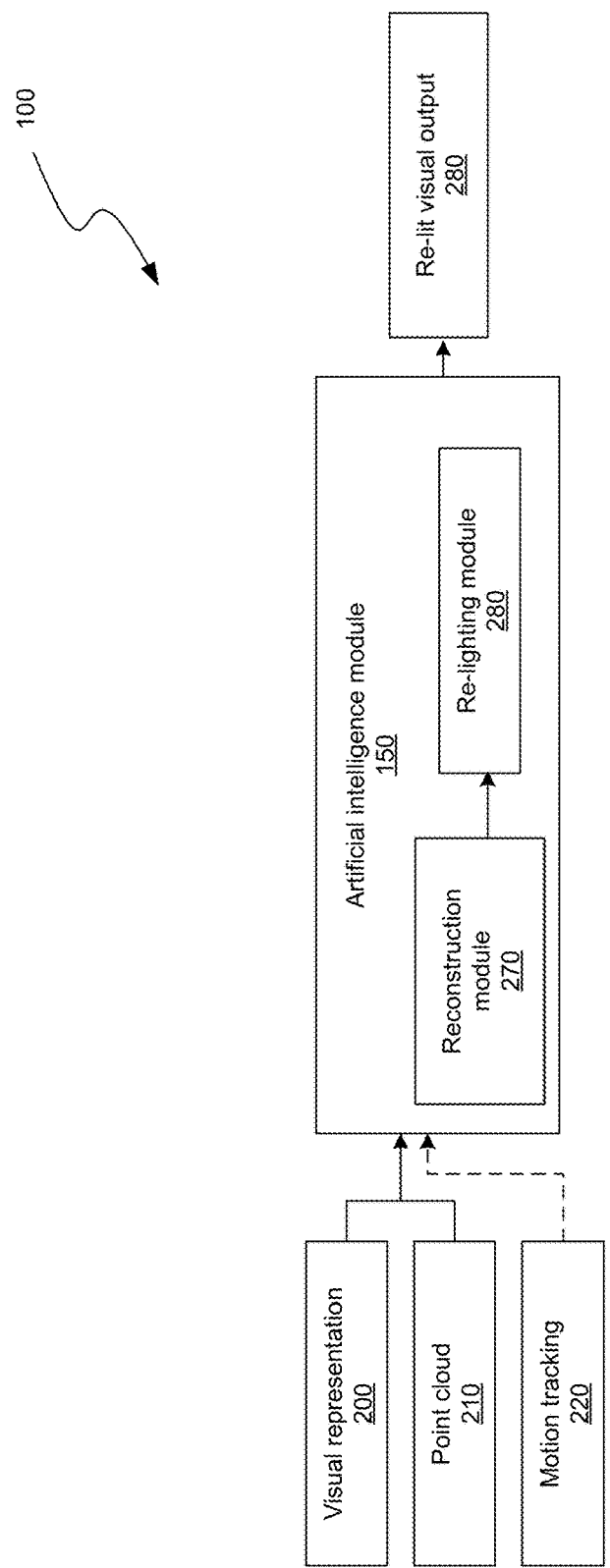
FIG. 2C shows a system architecture to perform re-lighting using the intelligent camera.

FIG. 2C shows a system architecture to perform re-lighting using the intelligent camera 100. The sensors 110, 120, 130, 140 in FIG. 1 can produce data such as visual representation 200, point cloud 210, and/or motion tracking data 220. Using these inputs, the artificial intelligence module 150 can perform re-lighting of the visual representation 200. The artificial intelligence module 150 can include the reconstruction module 270 and optionally a re-lighting module 280.

The reconstruction module 270 re-creates the geometry of a three-dimensional scene associated with the visual representation 200 using the point cloud 210. The reconstruction module 270 can obtain information about the texture and colors of the three-dimensional scene using the visual representation 200. Based on the three-dimensional scene, the re-lighting module 280 can place additional lights within the three-dimensional scene to create various lighting effects. For example, the re-lighting module 280 can create studio lighting conditions by adding three lights to the scene such as key light, fill light, and backlight. In another example, the re-lighting module 280 can create sunrise lighting conditions, sunset lighting conditions, dramatic lighting, can fix unwanted shadows, etc.

The reconstruction module 270 can be a neural network trained to create a three-dimensional scene from a point cloud 210 and an optional visual representation 200. The neural network can be trained to reconstruct symmetric objects to fill in information missing from the point cloud 210.

The re-lighting module 280 can also be a neural network trained to produce aesthetically pleasing lighting based on an input three-dimensional scene. In addition, the lighting module 280 can contain the rendering engine producing a re-lit visual output 285. The visual output 285 can be an image or a video.

The reason that the re-lighting of the visual representation 200 can be done in real time is threefold: the usage of specialized neural networks, efficient combination of artificial intelligence module 150 and traditional rendering, and dedicated hardware. First, the re-lighting task can be split between two specialized neural networks. The neural network 270, trained to reconstruct geometry from the point cloud 210, and the neural network 280 trained to create pleasing three-dimensional lighting. Second, the rendering of the three-dimensional lighting can be performed using traditional rendering techniques. Third, dedicated hardware such as an artificial intelligence chip or a GPU support fast computations of the neural networks 270, 280 while dedicated hardware such as a GPU supports rendering of the three-dimensional image.

The system architecture depicted in FIGS. 2A-2C can be wholly implemented on a mobile device, can be wholly implemented on a mobile device accessory, or can be implemented part on mobile device accessory and part on a mobile device. For example, the accessory can produce the visual representation 200, the point cloud 210, and/or motion tracking, and the rest of the modules can be included on the mobile device. In another example, in addition to producing outputs 200, 210, 220, the accessory can contain the segmentation module 230, the automatic framing module 260, the reconstruction module 270 and/or the re-lighting module 280, while the rest of the modules can be included on the mobile device. In a third example, the mobile device can contain the processing module 160, while the remainder of the modules in FIGS. 2A-2C are included in the mobile device accessory.

Figure 3:
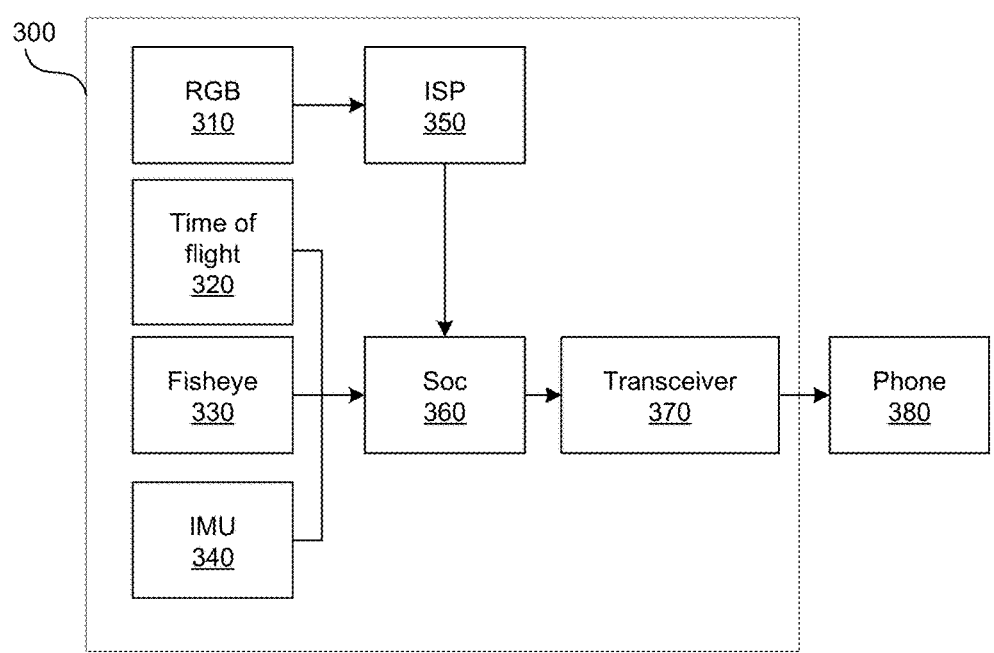
FIG. 3 shows an architecture of an accessory performing the functions described in this application.

FIG. 3 shows an architecture of an accessory performing the functions described in this application. The accessory 300 contains an RGB sensor 310, a time of flight sensor 320, a fisheye sensor 330, an inertial measurement unit (IMU) sensors 340, an image signal processor (ISP) 350, a system on chip (SOC) 360, and an extremely high frequency wireless communication transceiver 370, such as a SiBeam transceiver. Data from the accessory 300 is transmitted to the device 380 via transceiver 370.

The RGB sensor 310 can be a 20 megapixel IMX204 sensor. The RGB sensor 310 feeds the recorded image and/or video to the image signal processor 350, which in turn feeds the processed image and flash or video to the system on chip 360. The time of flight sensor 320 can be VGA IRS1645C sensor. The fisheye sensor 330 can be OV7251. The system on chip 360 can include conventional processor, a GPU and/or a TPU.

The system on chip 360 receives the data from the image signal processor 350, the time of flight sensor 320, the fisheye sensor 330, and the IMU sensors 340 to generate the point cloud and motion tracking data. The system on chip 360 can send the visual presentation (such as image and/or video), the point cloud and the motion tracking data to the device 380 for further processing, or the system on chip 360 can utilize the data to perform various functions described in this application such as segmenting a visual representation, automatically framing the visual representation, and re-lighting the visual representation. The system on chip 360 can subsequently send the output to the device 380.

Figure 4:
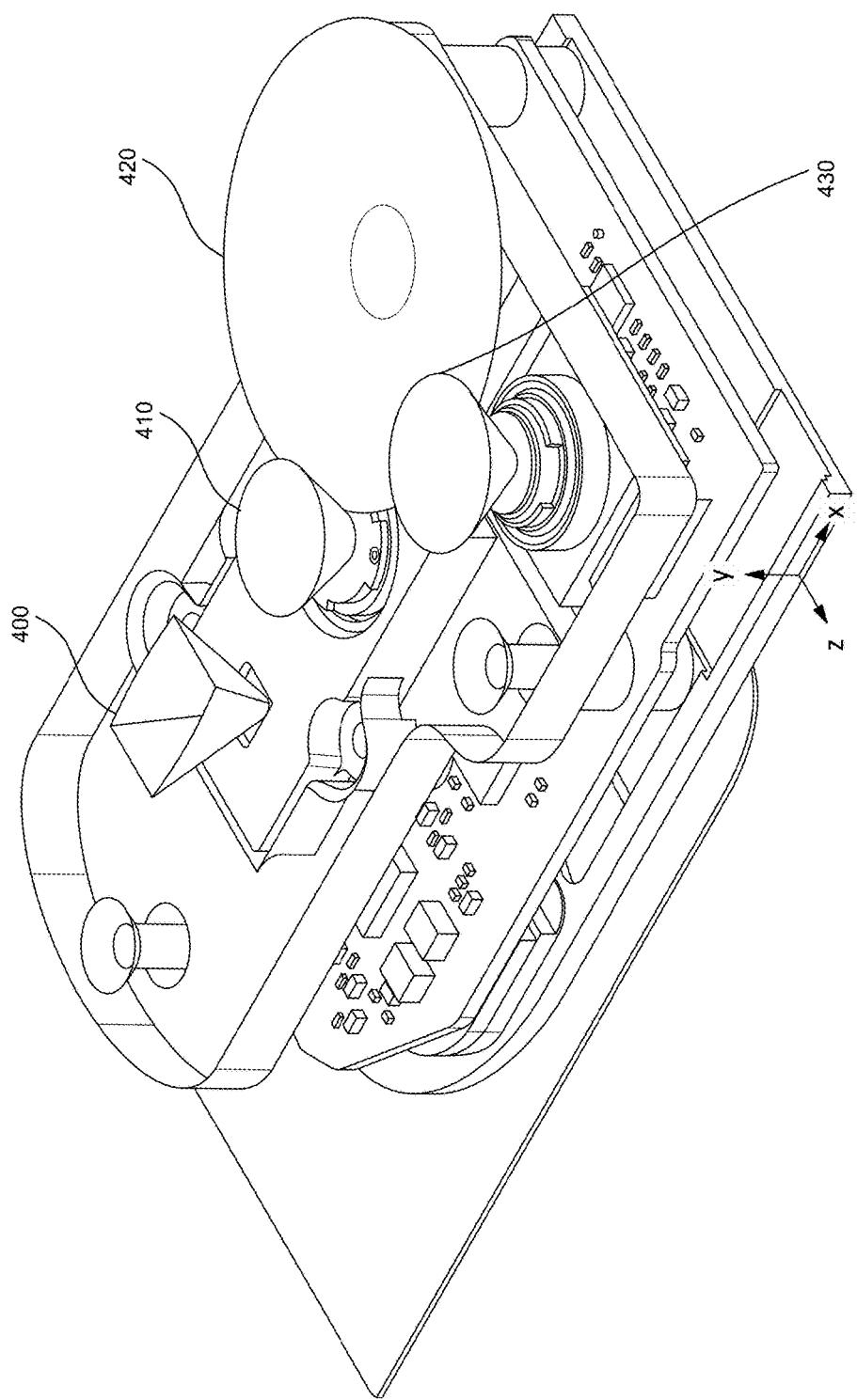
FIG. 4 shows a perspective view of three sensors used in performing the functions described in this application.

FIG. 4 shows a perspective view of three sensors used in performing the functions described in this application. The sensors include the depth sensor 400, 410, the motion tracking sensor 420, and the RGB camera 430. The depth sensor includes a light emitter 400 and the light receiver 410. The light emitter 400 and the light receiver 410 measure a time of flight of a beam of light emitted by the light emitter 400, and received by the light receiver 410. The beam of light can be infrared (IR). The motion tracking sensor 420 can be a black-and-white fisheye lens having a viewing angle of up to 220° around the lens. The RGB camera 430 can be a standard color camera.

The light emitter 400 and the light receiver 410 are next to each other within 1 cm. The motion tracking sensor 420 and the RGB camera 430 are also next to each other within 1 cm. The light emitter 400 the light receiver 410, the motion tracking sensor 420, and the RGB camera 430 are placed proximate to each other and tend to have the same view of the surrounding environment. The light receiver 410, the motion tracking sensor 420, and the RGB camera 430 can touch, while the light emitter 400 can be offset within 1 cm from the light receiver 410.

Figure 5:
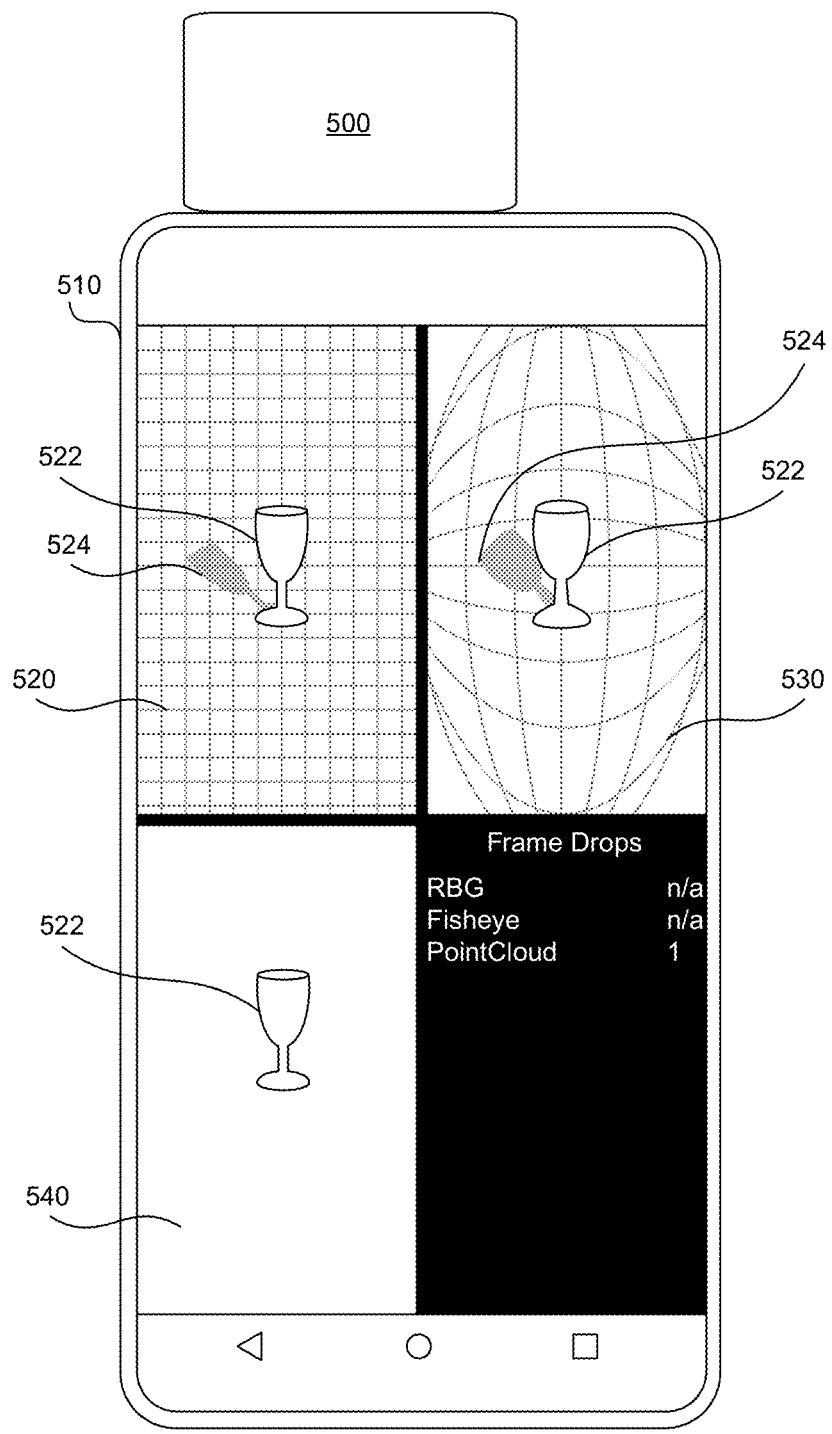
FIG. 5 shows an input received from sensors.

FIG. 5 shows an input received from sensors 400, 410, 420, 430 in FIG. 4. The sensors 400, 410, 420, 430 can be part of an accessory 500, as shown in FIG. 5, or the sensors 400, 410, 420, 430 can be part of a cell phone 510. The RGB camera 430 produces an image 520 of the surrounding environment, including an object 522 and its shadow 524. The motion tracking sensor 420 produces an image 530 including the wide angle view of the environment, including the object 522 distorted, and the shadow 524 distorted. The depth sensor 400, 410 produces depth measurement of the environment, which can be rendered as a monochrome image 540 representing varying depths. The depth sensor includes information about the distance of the object 522, but does not contain the shadow 524. The information contained in the images 520, 530, 540 is sent to the artificial intelligence module 150 in FIG. 1, 230 in FIG. 2A, 216 FIG. 2B, 270 in FIG. 2C for further processing.

Figure 6:
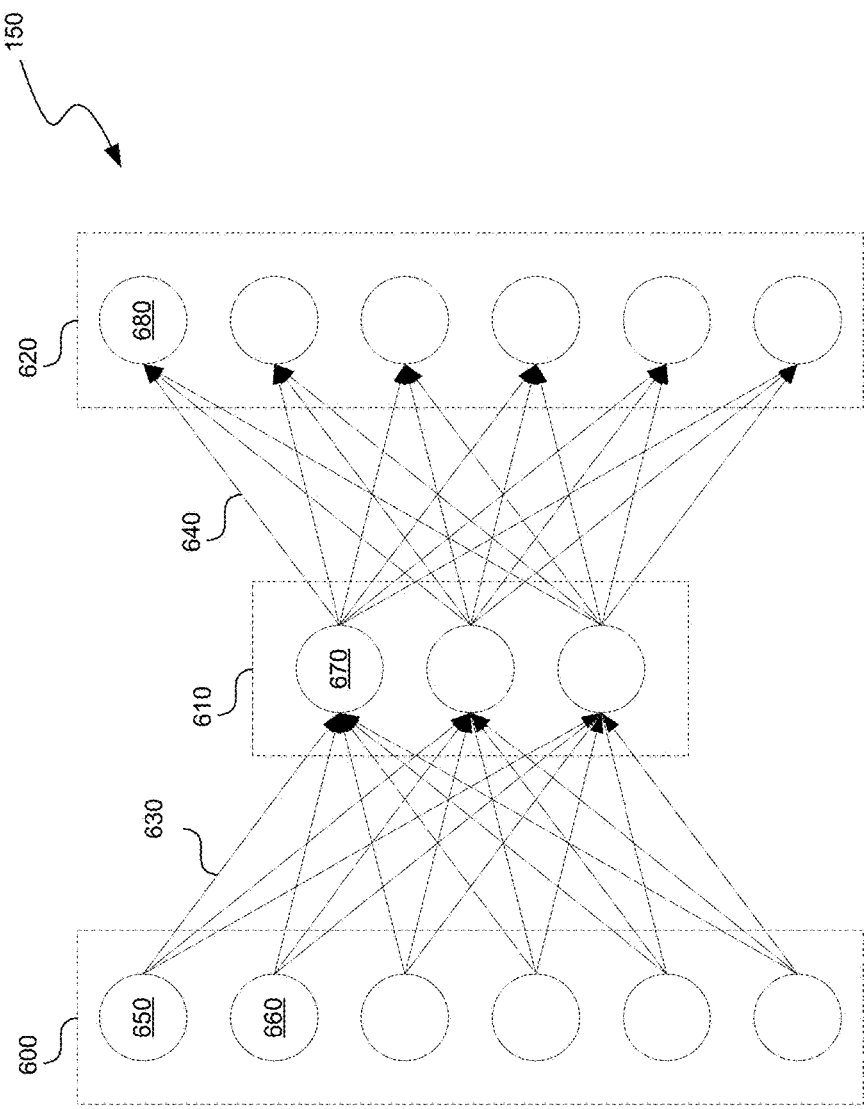
FIG. 6 shows an artificial intelligence module.

FIG. 6 shows an artificial intelligence module. The artificial intelligence module 150 can be a neural network. The neural network can include multiple layers 600, 610, 620 of nodes, also called neurons. The layers are executed sequentially such that the first layer 600 sends the output 630 (only one labeled for brevity) to the subsequent layer 610, which in turn sends the output 640 (only one labeled for brevity) to layer 620. Layer 620 is the output layer providing the final result of the neural network. In other embodiments, there can be multiple layers between layer 600 and layer 620.

Each layer 600, 610, 620 contains one or more nodes 650, 660, 665, 670, 680 (only some of the nodes labeled in each layer for brevity). The nodes 650, 660 perform their computations in parallel. For example, the computations associated with the layer 600 of the two nodes 650, 660 are performed at the same time, and can be performed on separate processors such as the central processing unit (CPU), TPU, GPU, etc. For example, node 650 can perform a computation on the TPU, while the node 660 can perform the operation on the GPU.

Image Segmentation

Figure 7:
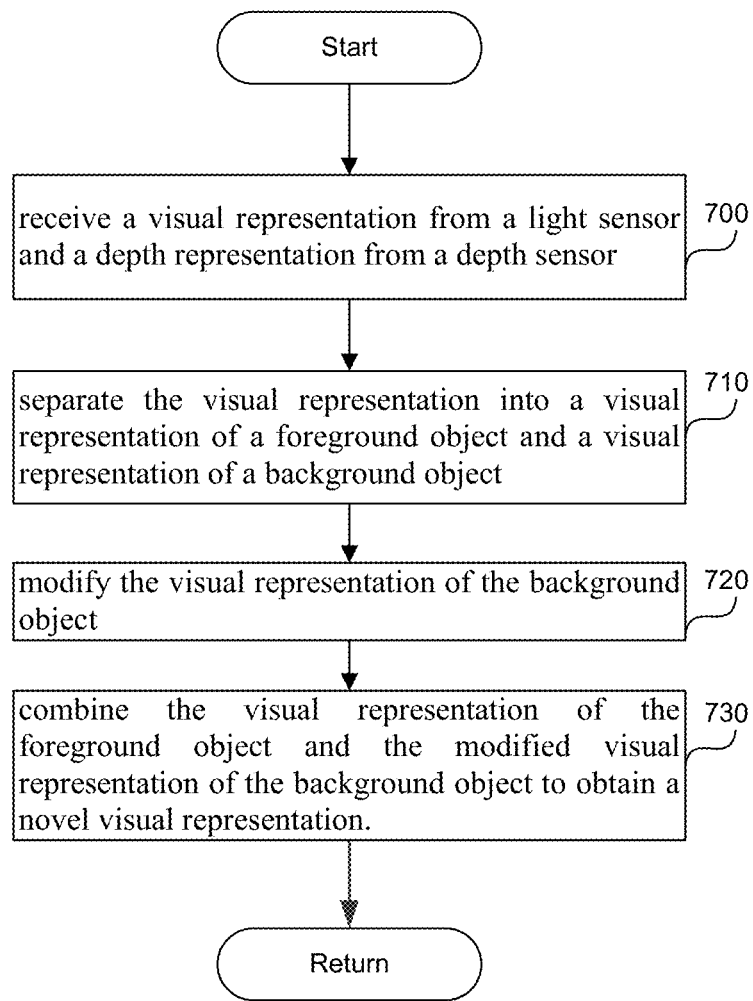
FIG. 7 is a flowchart of a method to create an artistic image with a cell phone camera in real time.

FIG. 7 is a flowchart of a method to create an artistic image with a cell phone camera in real time. Cell phone cameras, unlike high-end single-lens reflex (SLR) cameras, contain only one normal lens, which cannot record artistic images such as portrait images without additional processing. The additional processing, however, is time-consuming, and today's cell phone cameras, such as Apple and Google cell phone cameras, require 3 to 4 seconds to create a portrait image. At such high processing times per image, generating artistic videos requires hours. The methods and systems disclosed in this application perform the image processing in real time, i.e. in less than 1/100th of a second (i.e. a centisecond), and preferably in a few milliseconds. The real time processing is achieved by utilizing specialized hardware such as an artificial intelligence chip, e.g. a tensor processing unit (TPU), and/or a GPU to run the artificial intelligence module 150 in FIG. 1, and by monitoring the computation time of the artificial intelligence module 150 and parallelizing execution of the artificial intelligence module 150 across several processors such as the artificial intelligence chip, GPU and/or a CPU.

In step 700, a processor receives a visual representation from a light sensor and a depth representation from a depth sensor. The visual representation can be an image or video recorded by the light sensor. The depth presentation can be a scalar value representing the distance between the light sensor and an object in the environment. The light sensor and the depth sensor can be substantially collocated with each other. The depth representation can be a set of depth measurements represented as a point cloud or as a connected mesh. The light sensor can be a traditional RGB camera, a depth sensor can be an infrared time of flight sensor, a structured light sensor, etc.

In step 710, the artificial intelligence module 150 separates the visual representation into a visual representation of a foreground object and a visual representation of a background object. The artificial intelligence module 150 can be trained to receive the visual representation and to identify the foreground object and the background object in the visual representation. In one embodiment, the artificial intelligence module 150 can also utilize both the visual representation and the depth representation to identify the foreground object and the background object in the visual representation. In another embodiment, the artificial intelligence module 150 utilizes only the visual representation to produce a first foreground object and a first background objects, while the processor utilizes a depth representation to further refine the first foreground object and the first background object into the final visual representation of the foreground object and the background object.

In one embodiment, to separate the visual representation into the foreground and the background, the processor can receive the visual representation of the foreground object and the visual representation of the background object from the artificial intelligence module 150. The processor can verify whether a classification of an object into the foreground or the background is correct using a second artificial intelligence module trained to receive the visual representation of the foreground object, the visual representation of the background object and the depth representation and to identify whether the classification of the object should be changed. When the classification of the object should be changed, the processor can reclassify the object into one of the visual representation associated with the foreground object or the visual representation associated with the background object. In this embodiment, the processor can utilize a multistage artificial intelligence module which can take the form of two neural networks connected to each other such that the output of one neural network becomes the input of another neural network. In addition, the second neural network also receives the depth representation as the input.

In another embodiment, to separate the visual representation into the foreground and the background, the processor can receive the visual representation of the foreground object and the visual representation of the background object from the artificial intelligence module 150. The processor can determine whether a classification of an object into the foreground or the background is correct by checking whether a first depth associated with the foreground object in the depth representation and a second depth associated with the background object in the depth representation is below a predetermined threshold. When the classification of the object should be changed, the processor can reclassify the object into one of the visual representation associated with the foreground object or the visual representation associated with the background object.

For example, the processor can have a predetermined range of distances that define the foreground and background, such as any object within 2 m from the light sensor is in the foreground, while any object beyond 2 m from the light sensor is the background. In that case, if an object that is 3 m away from the light sensor is classified as a foreground object, the processor, upon checking the classification, can reclassify the object that is 3 m away as a background object. In another example, the processor can measure the maximum depth of the scene. If the maximum depth is measurable, and not infinite, the processor can define all objects that are within 30 percent of the maximum depth is foreground objects, and all other objects as background objects. In a third example, the processor can determine the closest object to the light sensor, and any object within 2 m of the closest object can be classified as a foreground object.

In another embodiment, to separate the visual representation into the foreground and the background, the processor can determine an average distance between the foreground object and the background object. When the average distance between the foreground object and the background object is below a predetermined threshold, the processor can reclassify the background object into the visual representation of the foreground object. The predetermined threshold can be 2 m, or can be a percentage of the thickness of the foreground object. For example, the thickness of the foreground object can be the difference between the maximum and minimum distance of the foreground object. The predetermined threshold can be two times the thickness of the foreground object. In a more specific example, if the thickness of the foreground object is 0.5 m, any object whose average distance to the foreground object is within 1 m distance from the foreground object is considered to be also foreground object.

In a third embodiment, to separate the visual representation into the foreground and the background, the processor can determine a distance between a farthest point on the foreground object and a farthest point on the background object. When the distance is below the predetermined threshold, reclassifying the background object into the visual representation of the foreground object.

In step 720, the processor modifies the visual representation of the background object. In addition, the processor can modify the foreground object as well, such as sharpening the foreground object, softening the lighting, blurring the foreground object, etc. In one embodiment, the processor can blur the visual representation of the background object, and combine the visual representation of the foreground object and the blurred visual representation of the background object to obtain the novel visual representation, such as a portrait image or a portrait video.

In another embodiment, the processor can create a chroma key effect by replacing the visual representation of the background object with a second visual representation, and combining the visual representation of the foreground object and the second visual representation. The newly obtained visual representation can be an image or video. For example, a videoconferencing application can replace the office setting background, with the presentation slides, White House as the background, an advertisement, a sunset scene, etc.

In step 730, the processor combines the visual representation of the foreground object and the modified visual representation of the background object to obtain a novel visual representation.

As described in this application, the artificial intelligence module 150 includes multiple layers arranged sequentially, each layer among the multiple layers having one or more nodes. The nodes in a single layer perform their respective computations in parallel. This parallelism enables efficient distribution of computations across multiple processors.

For example, a processor can measure an amount of time needed to separate the image into the image of the foreground object and the image of the background object. When the amount of time exceeds a predetermined amount of time, the processor can distribute a first group of nodes, such as nodes 650, 660 in FIG. 6, associated with a first layer, such as layer 600 in FIG. 6 across multiple processors associated with a device. The processor can measure the amount of time to do the image segmentation after the distribution, and keep distributing the nodes until the measured amount of time is below the predetermined amount of time. The processor measuring the time can be the processor running all or part the artificial intelligence module 150, or can be a processor not involved in running any part of the artificial intelligence module 150. The processor can be the CPU, the GPU, and/or the artificial intelligence chip associated with the device. The device can be a mobile device such as a cell phone, and/or an accessory of the mobile device.

In another example, the processor can measure an amount of time to execute each layer in the multiple layers 600, 610, 620 in FIG. 6 of the artificial intelligence module 150. When the amount of time for one or more layers to execute exceeds a second predetermined amount of time, such as a third of the predetermined amount of time, the processor can distribute the nodes of the one or more layers across additional processors. In this case, 610 is executing below the second predetermined amount of time, the nodes of the layer 610 remain within a single processor. However, if layer 600, 620 are executing above the second predetermined amount of time, the nodes of the layers 600, 620 are distributed among multiple processors.

The depth sensor creates the depth representation by measuring a distance from the depth sensor to own object. The depth sensor can store the depth representation in memory. The depth sensor can discern depth up to 5 m away from the depth sensor. By contrast, dual cameras (i.e. stereoscopic vision) can discern depth up to 80 cm.

In addition to the depth measurement, the processor can use other methods such as parallax, and a three-dimensional map to classify various objects in the environment as foreground or background. For example, the processor can receive a video recorded by the light sensor or an additional motion tracking sensor such as a fisheye lens, and compare a magnitude of motion associated with the objects in the video. The processor can utilize parallax to determine which objects are in the foreground and in the background. Objects having a higher magnitude of motion in the video tend to be associated with the foreground, will objects having a lower magnitude of motion tend to be associated with the background.

In another example, the processor determines a location associated with the light sensor and the depth sensor, for example using global positioning system (GPS). The processor then retrieves a three-dimensional map from memory representing a first group of objects surrounding the light sensor and the depth sensor. The processor establishes a correspondence between the first group of objects associated with the three-dimensional map and a second group of objects associated with the visual representation. The processor separates the visual representation into the visual representation of the foreground object and the visual representation of the background object based on the correspondence. Some objects in the visual representation may not be in the three-dimensional map retrieved from memory because the objects could have been placed in the scene between the creation of the three-dimensional map and the recording of the visual representation. For objects not in the scene, the processor can update the three-dimensional map using depth measurements from the depth sensor, and store the updated three-dimensional map back in memory. For objects not in the scene, the processor uses the depth measurement to classify the object as foreground or background, as described in this application.

Figure 8:
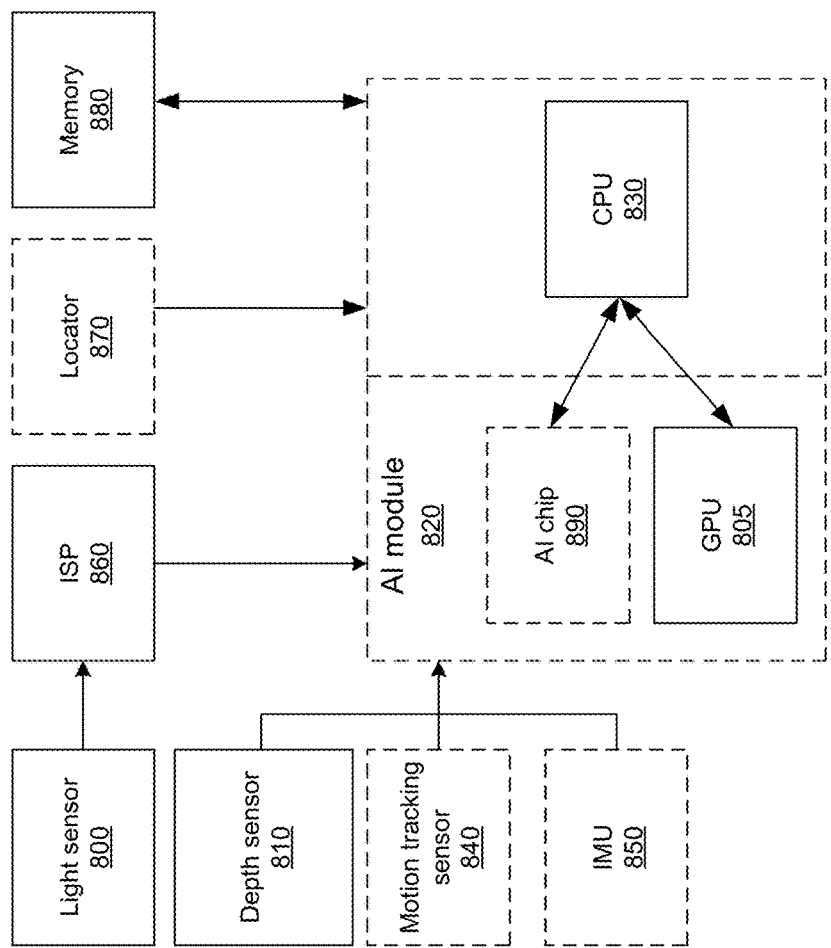
FIG. 8 shows an architecture of the system to perform image segmentation.

FIG. 8 shows an architecture of the system to perform image segmentation. The system contains a light sensor 800, a depth sensor 810, the artificial intelligence (AI) module 820, a central processing unit (CPU) 830, an optional motion tracking sensor 840, an optional inertial measurement unit (IMU) sensor such as an accelerometer, a gyroscope etc. 850, an image signal processor (ISP) 860, an optional locator 870, a memory 880, an optional artificial intelligence (AI) chip 890, and a graphics processing unit (GPU) 805. The system can run wholly on a mobile device, wholly on a mobile device accessory, or can be separated in various ways between the mobile device in the mobile device accessory.

The light sensor 800 can record a visual representation of an environment surrounding the light sensor. The depth sensor 810 can record a depth representation of the environment surrounding the depth sensor 810. The light sensor 800 and the depth sensor 810 are substantially collocated with each other. The depth sensor 810 can be an infrared sensor, structured light sensor, stereoscopic camera, etc. The depth sensor 810 can measure depth up to 5 meters away from the depth sensor 810, and store the depth representation in memory 880. The depth representation stored in memory 880 can be uploaded to a remote server.

The artificial intelligence module 820 is trained to receive the visual representation and the depth representation, to identify the foreground object and the background object and to separate the visual representation into a visual representation of a foreground object and a visual representation of a background object. The artificial intelligence module 820 can be a neural network as described in this application. The artificial intelligence module 820 can run on a chip 890 dedicated to running the artificial intelligence (AI) module 820. The artificial intelligence (AI) chip 890 can be a TPU. The artificial intelligence module 820 can also run on a GPU 805 and/or the CPU 830. The artificial intelligence module 820 can run in a distributed manner between the AI chip 890, the GPU 805 and/or the CPU 830, as described in this application.

The CPU 830 can modify the visual representation of the background object and can combine the visual representation of the foreground object and the modified visual presentation of the background object to obtain a novel visual representation. For example, the CPU 830 can create a portrait image, or a chroma key effect, as described in this application, in real time.

The CPU 830 can measure an amount of time associated with said separating the image into the image of the foreground object and the image of the background object. When the amount of time exceeds a predetermined amount of time, the CPU 830 can distribute a first group of nodes associated with a first layer among the multiple layers across multiple processors associated with a cell phone until the amount of time is below the predetermined amount of time. For example, the CPU 830 can distribute the execution of the artificial intelligence module 820 across the AI chip 890, the GPU 805, and/or the processor, itself, 830. Additionally, the CPU 830 can identify a layer of nodes that is the slowest to execute, and only distribute the execution of nodes in the slowest layer across the AI chip 890, the GPU 805, and and/or the CPU 830.

The CPU 830 can receive the visual representation of the foreground object and the visual representation of the background object from the artificial intelligence module 820. The CPU 830 can verify a classification of an object in the visual representation into the visual representation of the foreground object and the visual representation of the background object by checking whether a first depth associated with the foreground object in the depth representation and a second depth associated with the background object in the depth representation is below a predetermined threshold. The predetermined threshold can be defined as described in this application. When the classification of the object should be changed, the CPU 830 can reclassify the object into one of the visual representation associated with the foreground object or the visual representation associated with the background object.

To verify the segmentation of the visual representation, the CPU 830 can determine an average distance between the foreground object and the background object. When the average distance between the foreground object and the background object is below the predetermined threshold, the CPU 830 can reclassify the background object into the visual representation of the foreground object. The predetermined threshold can be defined as described in this application.

In another example, to verify the segmentation of the visual representation, the CPU 830 can determine a distance between a farthest point on the foreground object and a farthest point on the background object. When the distance is below the predetermined threshold, the CPU 830 can reclassify the background object into the visual representation of the foreground object.

For example, the CPU 830 can blur the visual representation of the background object, and can combine the visual representation of the foreground object and the blurred visual representation of the background object to obtain the novel visual representation such as a portrait image, or a portrait video. In another example, the CPU 830 can replace the visual representation of the background object with a second visual representation, and create a chroma key effect by combining the visual representation of the foreground object and the second visual representation.

The motion tracking sensor 840, such as a fisheye lens, can record a video of a scene, and produce motion tracking data showing the vectors of motion of various objects within the scene from frame to frame. Based on the motion tracking data, the CPU 830 can compare a magnitude of motion associated with the various objects within the scene. The CPU 830 can associate a first object in the scene having a higher magnitude of motion with the visual representation of the foreground object, and a second object among the multiple objects having a lower magnitude of motion with the visual position of the background object.

The locator 870 along with the inertial measurement unit 850 can determine a location of the light sensor 800 and the depth sensor 810. The CPU 830 can retrieve a three-dimensional map from a memory 880 representing a first group of objects surrounding the light sensor 800 and the depth sensor 810. The CPU 830 can establish a correspondence between the first group of objects associated with the three-dimensional map and a second group of objects associated with the visual representation. Alternatively, the AI module 820 can establish the correspondence. The AI module 820 can run on the AI chip 890, the GPU 805, and/or the CPU 830. The CPU 830 can separate the visual representation into the visual representation of the foreground object and the visual representation of the background object based on the correspondence.

Automatic Framing

Figure 9:
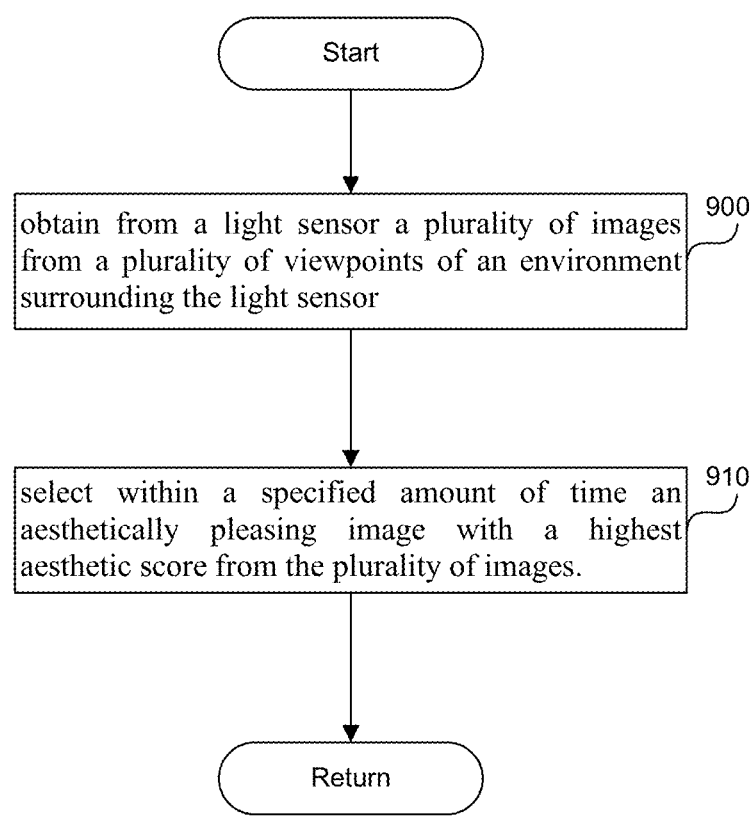
FIG. 9 is a flowchart of a method to create aesthetically pleasing images in real time with a cell phone camera.

FIG. 9 is a flowchart of a method to create aesthetically pleasing images in real time with a cell phone camera. In step 900, a processor obtains from a light sensor multiple images from multiple viewpoints of an environment surrounding the light sensor. The images are obtained by continually moving the light sensor through the viewpoints. The images can be a prerecorded video or a real-time camera input, as the user is moving the camera around the scene.

In step 910, the processor selects within a specified amount of time, i.e. real-time, an aesthetically pleasing image with a highest aesthetic score from the images by using an artificial intelligence module trained to assign an aesthetic score to each image among the multiple images. The artificial intelligence module can include style, exposure, contrast, brightness, color pattern, composition, etc. in calculating the aesthetic score. In scoring composition, the artificial intelligence module can evaluate framing of the image, proximity of foreground objects to the center of the image, location of the vanishing point, etc.

In another embodiment, the artificial intelligence model can obtain from a depth sensor substantially collocated with the light sensor multiple depth measurements from multiple viewpoints of the environment surrounding the depth sensor. The multiple viewpoints can be obtained by continually moving the depth sensor through the multiple viewpoints, where each depth measurement among the multiple depth measurements corresponds to an image among the multiple images. The artificial intelligence module can run on the dedicated processor and can be trained to assign an aesthetic score to each image among the multiple images based on the multiple depth measurements among the multiple images. The artificial intelligence model can select within the specified amount of time the aesthetically pleasing image with the highest aesthetic score from the multiple images using the artificial intelligence module.

In a third embodiment, the artificial intelligence module can obtain from a motion tracking sensor substantially collocated with the light sensor multiple motion tracking data associated with multiple objects among the multiple image. The artificial intelligence module can run on the dedicated processor and can be trained to assign an aesthetic score to each image among the multiple images based on the multiple motion tracking data and the multiple images. The artificial intelligence module can select within the specified amount of time the aesthetically pleasing image with the highest aesthetic score from the multiple images.

As described in this application, the artificial intelligence module can be a neural network, as shown in FIG. 6. The operation of the artificial intelligence module in real time can be achieved by running the artificial intelligence module on dedicated hardware, such as the AI chip 890 in FIG. 8, and/or distributing the operation of the artificial intelligence module across multiple processors, as described in this application. To achieve real-time performance, the specified amount of time should not exceed ¹/₁₀₀ of a second, i.e. a centisecond.

The multiple images can include an ordered sequence of images from an ordered sequence of viewpoints. The processor can obtain an amount of time for the artificial intelligence module to assign the aesthetic score to an initial image in the ordered sequence of images. The processor can measure the amount of time, or the processor can look up from memory a previously measured amount of time. When a number of the ordered sequence of images combined with the amount of time exceeds the specified amount of time, the processor can achieve the selection within the specified amount of time by dropping a subset of images in the ordered sequence of images to obtain faster processing. The processor can drop nonconsecutive images.

To determine the number of images to drop, the processor can perform the following calculation. Let us assume that the amount of time to process a single image is T, that there are N images, and that the specified amount of time is capital ST. The processor needs to drop (T*N−ST)/T images, to ensure that the processing can be done within the specified amount of time ST. When input images are live feed, the total number of images N, is not known. In that case, the processor can select the most aesthetically pleasing image from ST/T images, buffering the rest of images as they are coming in. Other additional optimization techniques can be applied, as described in this application.

For example, the processor can distribute the computation of the AI module across multiple processors, as described in this application. If even after distributing the AI computational across multiple processors does not achieve the specified amount of time, the processor can drop a subset of images in the ordered sequence of images to obtain faster processing.

Figure 10:
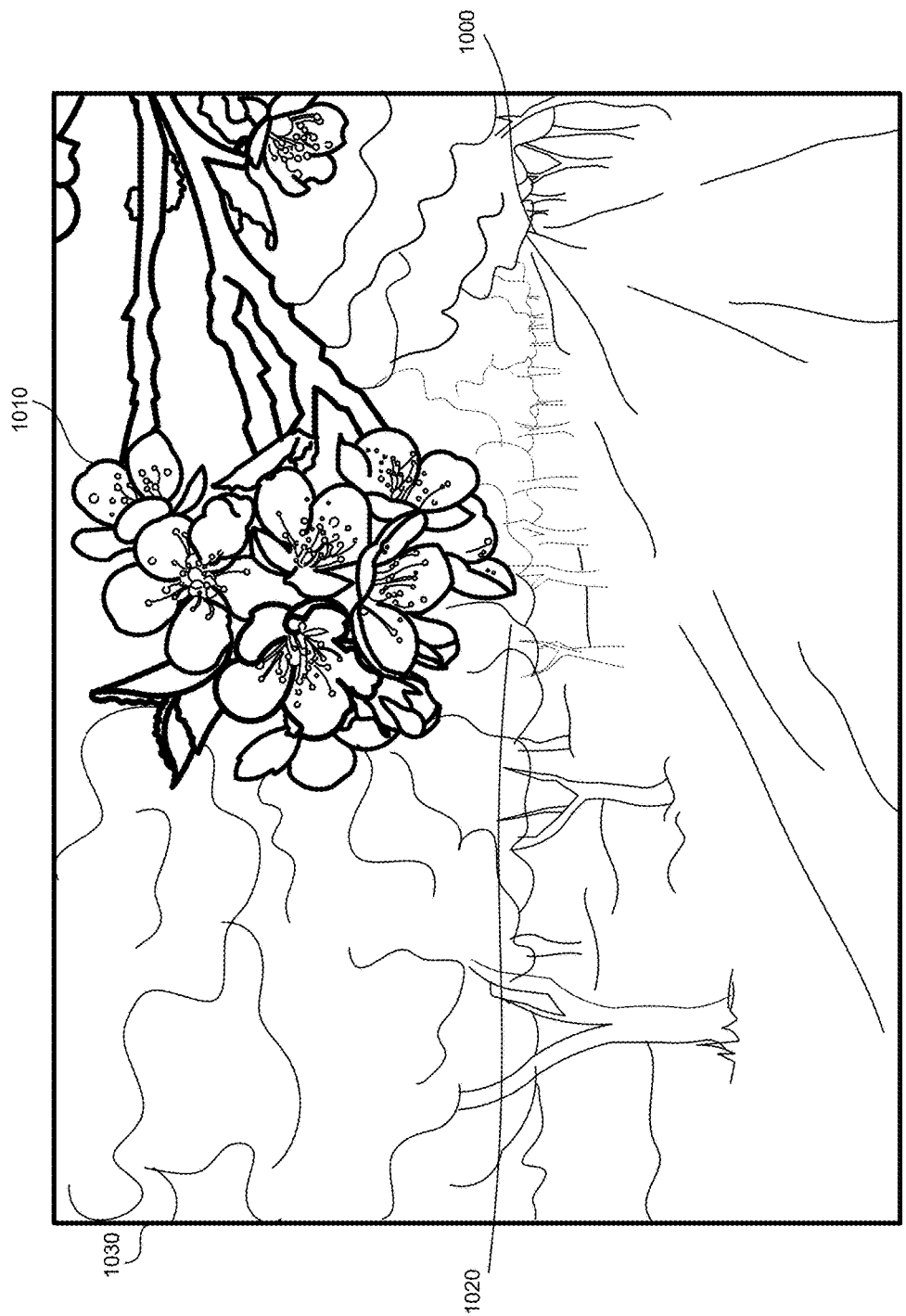
FIG. 10 shows an image with a high aesthetic score, according to one embodiment.

FIG. 10 shows an image with a high aesthetic score, according to one embodiment. The artificial intelligence module can determine a presence of a vanishing point 1000 associated with an image among the multiple images by, for example, detecting converging lines in the image. The artificial intelligence module can determine a presence of a foreground object 1010 (in bold lines in FIG. 10) associated with the image 1030. The artificial intelligence module can assign a high aesthetic score to the image where the foreground object 1010 and the vanishing point 1000 are proximate to each other and to a center 1020 of the image 1030. The proximity of the foreground object 1010, the vanishing point 1000, and the center 1020 of the image 1030 can be defined such that the foreground object 1010, the vanishing point 1000 and the center 1020 of the image 1030 are located within a region occupying at most 25% of the total image area.

In another example, the artificial intelligence module can track a motion of multiple objects in the multiple images. The artificial intelligence module can detect an object among the multiple objects with a least amount of motion, which indicates that the object is a foreground object 1010. The artificial intelligence module can assign a high aesthetic score to an image among the multiple images where the object with the least amount of motion is proximate to the center 1020 of the image 1030. The proximity of the foreground object 1010 and the center 1020 of the image 1030 can be defined such that the foreground object 1010 and the center 1020 of the image 1030 are located within a region occupying at most 25% of the total image area.

Figure 11:
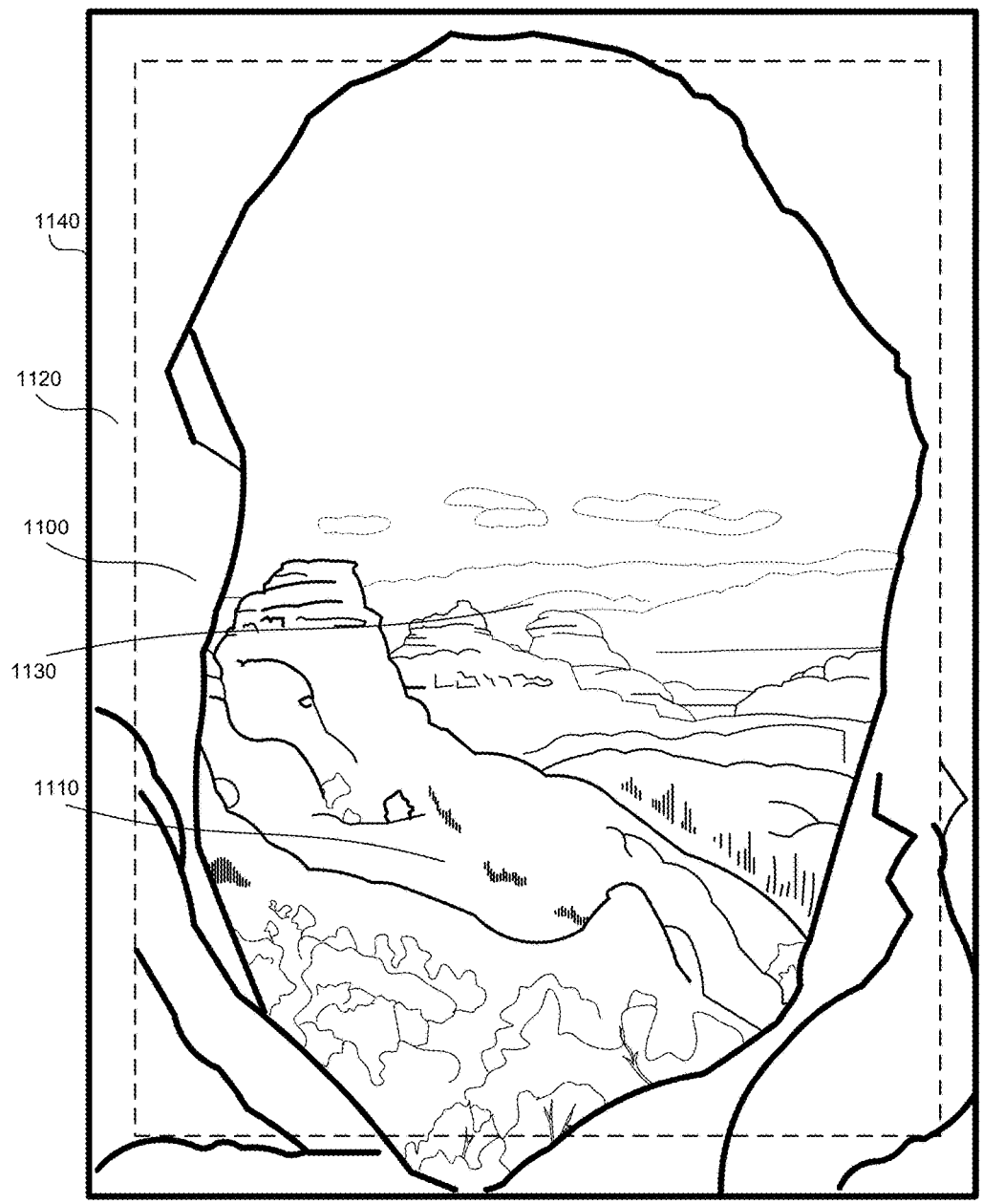
FIG. 11 shows an image with a high aesthetic score, according to one embodiment.

FIG. 11 shows an image with a high aesthetic score, according to one embodiment. The artificial intelligence module can segment multiple images into a foreground object 1100 and a background object 1110. The artificial intelligence module can determine a location of the foreground object 1100 within each image among multiple images. The artificial intelligence module can assign a high aesthetic score to an first image 1030 in FIG. 10 among the multiple images where the foreground object is proximate to a center 1020 of the image 1030, as shown in FIG. 10, or to a second image 1140 among the multiple images were the foreground object is proximate to an edge 1120 of the image 1140 and substantially symmetric about the center 1130 of the image 1140, as shown in FIG. 11. In aesthetically pleasing images, the foreground object 1100 can be used for framing the image 1140, in which case the background object 1110 should be proximate to the center 1130 of the image 1140. In other aesthetically pleasing images, the foreground object 1010 in FIG. 10 can be most important, in which case the foreground object 1010 should be around the center 1020 of the image 1030.

Figure 12:
FIG. 12 shows visual notification of the most aesthetically pleasing image displayed to the user.

FIG. 12 shows visual notification of the most aesthetically pleasing image displayed to the user. When the multiple images includes a live feed from the light sensor, the artificial intelligence module can select the aesthetically pleasing image from the live feed, and provide a visual notification 1200 along with the aesthetically pleasing image 1210 on a display associated with the light sensor. The visual notification 1200 indicates to the user to record the aesthetically pleasing image 1210. Instead of providing the visual notification 1200 to the user, the artificial intelligence module can automatically record the most aesthetically pleasing image from the live feed. When the multiple images include a prerecorded video, the artificial intelligence module can select the most aesthetically pleasing image from the prerecorded video, and provide the most aesthetically pleasing image as a suggestion to a user for the user's approval.

Computer

Figure 13:
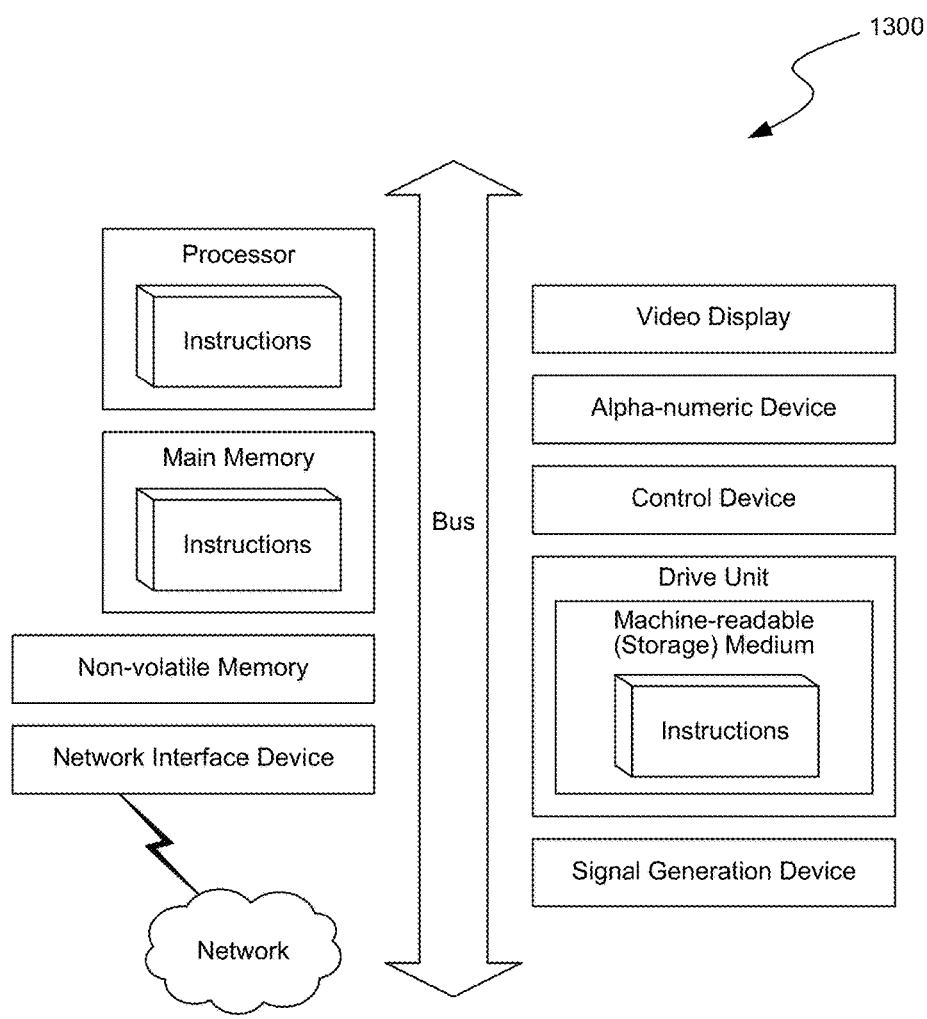
FIG. 13 is a diagrammatic representation of a machine in the example form of a computer system within which a set of instructions, for causing the machine to perform any one or more of the methodologies or modules discussed herein, may be executed.

FIG. 13 is a diagrammatic representation of a machine in the example form of a computer system 1300 within which a set of instructions, for causing the machine to perform any one or more of the methodologies or modules discussed herein, may be executed.

In the example of FIG. 13, the computer system 1300 includes a processor, memory, non-volatile memory, and an interface device. Various common components (e.g., cache memory) are omitted for illustrative simplicity. The computer system 1300 is intended to illustrate a hardware device on which any of the components described in the example of FIGS. 1-12 (and any other components described in this specification) can be implemented. The computer system 1300 can be of any applicable known or convenient type. The components of the computer system 1300 can be coupled together via a bus or through some other known or convenient device.

The computer system 1300 can be associated with the accessory or the device. The processor can be the processor running the artificial intelligence module 150 in FIG. 1, 230 in FIG. 2A, 260 FIG. 2B, 270 in FIG. 2C, 820 in FIG. 8. The processor can be a CPU, AI chip, or a GPU. Further, the processor can be a conventional processor running conventional image processing operations such as blurring and sharpening, described in this application. The memory of the computer system 1300 can store the three-dimensional map of the environment created by the computer system 1300. The network interface device of the computer system 1300 can be a wireless interface between the accessory 500 in FIG. 5 and the device 510 in FIG. 5. In addition, the network interface device can be a wireless network card associated with the device 510.

This disclosure contemplates the computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1300 may include one or more computer systems 1300; be unitary or distributed; span multiple locations; span multiple machines; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1300. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing and entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 1300. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 13 reside in the interface.

In operation, the computer system 1300 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. A method to create a portrait image in real time with a cell phone camera, the method comprising:
   receiving an image from a camera and a depth measurement from a depth sensor, the camera and the depth sensor substantially collocated with each other;
   separating the image into an image of a foreground object and an image of a background object using the depth measurement and a neural network trained to receive the image and the depth measurement and to identify the foreground object and the background object, the neural network running on a processor optimized to execute operations associated with the neural network wherein the neural network comprises a plurality of layers arranged sequentially, each layer in the plurality of layers comprising a plurality of nodes performing a plurality of computations in parallel;
   measuring an amount of time associated with separating the image into the image of the foreground object and the image of the background object;
   when the amount of time exceeds a predetermined amount of time, distributing a first plurality of nodes associated with a first layer in the plurality of layers across multiple processors associated with a cell phone until the amount of time is below the predetermined amount of time;
   blurring the image of the background object; and
   overlaying the image of the foreground object and the blurred image of the background object to obtain the portrait image.

2. A method comprising:
   receiving a visual representation from a light sensor and a depth representation from a depth sensor, the light sensor and the depth sensor substantially collocated with each other;
   separating the visual representation into a visual representation of a foreground object and a visual representation of a background object using the depth representation and an artificial intelligence module trained to receive the visual representation and to identify the foreground object and the background object, said separating the visual representation comprising:
      receiving the visual representation of the foreground object and the visual representation of the background object from the artificial intelligence module;
      verifying a classification of an object in the visual representation into the visual representation of the foreground object and the visual representation of the background object by checking whether a first depth associated with the foreground object in the depth representation and a second depth associated with the background object in the depth representation is below a predetermined threshold;
      when the classification of the object should be changed, reclassifying the object into one of the visual representation associated with the foreground object or the visual representation associated with the background object;
   modifying the visual representation of the background object; and
   combining the visual representation of the foreground object and the modified visual representation of the background object to obtain a novel visual representation.

3. The method of claim 2, wherein the artificial intelligence module comprises a plurality of layers arranged sequentially, each layer in the plurality of layers comprising a plurality of nodes performing a plurality of computations in parallel, the method comprising:
   measuring an amount of time associated with separating the visual representation into the visual representation of the foreground object and the visual representation of the background object; and
   when the amount of time exceeds a predetermined amount of time, distributing a first plurality of nodes associated with a first layer in the plurality of layers across multiple processors associated with a cell phone until the amount of time is below the predetermined amount of time.

4. The method of claim 2, said separating the visual representation comprising:
   receiving the visual representation of the foreground object and the visual representation of the background object from the artificial intelligence module;
   verifying the classification of the object in the visual representation into the visual representation of the foreground object and the visual representation of the background object using a second artificial intelligence module trained to receive the visual representation of the foreground object, the visual representation of the background object and the depth representation and to identify whether the classification of the object should be changed; and
   when the classification of the object should be changed, reclassifying the object into one of the visual representation associated with the foreground object or the visual representation associated with the background object.

5. The method of claim 2, said checking comprising:
   determining an average distance between the foreground object and the background object; and
   when the average distance between the foreground object and the background object is below the predetermined threshold, reclassifying the background object into the visual representation of the foreground object.

6. The method of claim 2, said checking comprising:
   determining a distance between a farthest point on the foreground object and a farthest point on the background object; and
   when the distance is below the predetermined threshold, reclassifying the background object into the visual representation of the foreground object.

7. The method of claim 2, the predetermined threshold comprising a multiple of a difference between a closest point associated with the foreground object and a farthest point associated with the foreground object.

8. The method of claim 2, comprising:
   comparing a magnitude of motion associated with a plurality of objects in the visual representation; and associating a first object in the plurality of objects having a higher magnitude of motion with the visual representation of the foreground object, and a second object in the plurality of objects having a lower magnitude of motion with the visual representation of the background object.

9. The method of claim 2, comprising:
determining a location associated with the light sensor and the depth sensor;
retrieving a three-dimensional map from memory representing a first plurality of objects surrounding the light sensor and the depth sensor;
establishing a correspondence between the first plurality of objects associated with the three-dimensional map and a second plurality of objects associated with the visual representation; and
separating the visual representation into the visual representation of the foreground object and the visual representation of the background object based on the correspondence.

10. A system comprising:
a light sensor to record a visual representation of an environment surrounding the light sensor;
a depth sensor to record a depth representation of the environment surrounding the depth sensor, the light sensor and the depth sensor substantially collocated with each other;
an artificial intelligence module trained to receive the visual representation and the depth representation, to identify a foreground object and a background object and to separate the visual representation into a visual representation of the foreground object and a visual representation of the background object; and
a processor to:
receive the visual representation of the foreground object and the visual representation of the background object from the artificial intelligence module;
verify a classification of an object in the visual representation into the visual representation of the foreground object and the visual representation of the background object by checking whether a first depth associated with the foreground object in the depth representation and a second depth associated with the background object in the depth representation is below a predetermined threshold;
when the classification of the object should be changed, reclassify the object into one of the visual representation associated with the foreground object or the visual representation associated with the background object; and
modify the visual representation of the background object and to combine the visual representation of the foreground object and the modified visual presentation of the background object to obtain a novel visual representation.

11. The system of claim 10, the system comprising:
the artificial intelligence module comprising a plurality of layers arranged sequentially, each layer in the plurality of layers comprising a plurality of nodes performing a plurality of computations in parallel;
the processor to measure an amount of time associated with said separating the visual representation into the visual representation of the foreground object and the visual representation of the background object; and
when the amount of time exceeds a predetermined amount of time, the processor to distribute a first plurality of nodes associated with a first layer in the plurality of layers across multiple processors associated with a cell phone until the amount of time is below the predetermined amount of time.

12. The system of claim 10, the processor to check comprising:
the processor to determine an average distance between the foreground object and the background object; and
when the average distance between the foreground object and the background object is below the predetermined threshold, the processor to reclassify the background object into the visual representation of the foreground object.

13. The system of claim 10, the processor to check comprising:
the processor to determine a distance between a farthest point on the foreground object and a farthest point on the background object; and
when the distance is below the predetermined threshold, the processor to reclassify the background object into the visual representation of the foreground object.

14. The system of claim 10, the predetermined threshold comprising a fraction of a difference between a closest point associated with the foreground object and a farthest point associated with the foreground object.

15. The system of claim 10, comprising:
the processor to compare a magnitude of motion associated with a plurality of objects in the visual representation; and
the processor to associate a first object in the plurality of objects having a higher magnitude of motion with the visual representation of the foreground object, and a second object in the plurality of objects having a lower magnitude of motion with the visual representation of the background object.

16. The system of claim 10, comprising:
a locator to determine a location associated with the light sensor and the depth sensor;
the processor to retrieve a three-dimensional map from a memory representing a first plurality of objects surrounding the light sensor and the depth sensor;
the processor to establish a correspondence between the first plurality of objects associated with the three-dimensional map and a second plurality of objects associated with the visual representation; and
the processor to separate the visual representation into the visual representation of the foreground object and the visual representation of the background object based on the correspondence.

* * * * *